(12) United States Patent
Vella et al.

(10) Patent No.: US 8,676,089 B2
(45) Date of Patent: Mar. 18, 2014

(54) COMPOSITION FOR USE IN AN APPARATUS FOR DELIVERY OF A FUNCTIONAL MATERIAL TO AN IMAGE FORMING MEMBER

(75) Inventors: Sarah J. Vella, Windsor (CA); Yu Liu, Mississauga (CA); Nan-Xing Hu, Oakville (CA); Richard A. Klenkler, Oakville (CA)

(73) Assignee: Xerox Corporation, Norwalk, CT (US)

( * ) Notice: Subject to any disclaimer, the term of this patent is extended or adjusted under 35 U.S.C. 154(b) by 246 days.

(21) Appl. No.: 13/192,252

(22) Filed: Jul. 27, 2011

(65) Prior Publication Data

US 2013/0028637 A1 Jan. 31, 2013

(51) Int. Cl.
*G03G 15/00* (2006.01)
*G03G 15/02* (2006.01)

(52) U.S. Cl.
USPC ........... 399/159; 399/176; 428/332; 428/447; 428/480; 428/421

(58) Field of Classification Search
USPC .......... 399/176, 346; 184/17, 101, 11.5, 15.1, 184/98, 99; 428/423.1
See application file for complete search history.

(56) References Cited

U.S. PATENT DOCUMENTS

| | | |
|---|---|---|
| 3,121,006 A | 2/1964 | Middleton et al. |
| 4,286,033 A | 8/1981 | Neyhart et al. |
| 4,291,110 A | 9/1981 | Lee |
| 4,338,387 A | 7/1982 | Hewitt |
| 4,387,980 A | 6/1983 | Ueno et al. |
| 4,464,450 A | 8/1984 | Teuscher |
| 4,587,189 A | 5/1986 | Hor et al. |
| 4,664,995 A | 5/1987 | Horgan et al. |
| 4,810,564 A * | 3/1989 | Takahashi et al. ............ 428/213 |
| 4,921,773 A | 5/1990 | Melnyk et al. |
| 5,069,993 A | 12/1991 | Robinette et al. |
| 5,215,839 A | 6/1993 | Yu |
| 5,469,247 A * | 11/1995 | Cheng et al. .................. 399/350 |
| 5,660,961 A | 8/1997 | Yu |
| 5,756,245 A | 5/1998 | Esteghamatian et al. |
| 5,958,638 A | 9/1999 | Katayama et al. |
| 6,360,065 B1 | 3/2002 | Ishibashi et al. |
| 6,434,357 B1 * | 8/2002 | Maul et al. ..................... 399/325 |
| 6,582,222 B1 * | 6/2003 | Chen et al. ...................... 432/60 |
| 6,660,399 B1 * | 12/2003 | Kitano et al. ................. 428/500 |
| 7,580,655 B2 * | 8/2009 | Nukada et al. ................ 399/176 |
| 2007/0078218 A1 * | 4/2007 | Sugimoto ..................... 524/565 |
| 2012/0201585 A1 * | 8/2012 | Hu et al. ....................... 399/346 |

* cited by examiner

Primary Examiner — Clayton E LaBalle
Assistant Examiner — Victor Verbitsky
(74) Attorney, Agent, or Firm — Pillsbury Winthrop Shaw Pittman LLP

(57) ABSTRACT

The presently disclosed embodiments relate generally to an image forming apparatus comprising a delivery member in contact with either the surface of an imaging member or in contact with the surface of the bias charge roller, wherein the delivery member is fabricated as a polymer matrix impregnated with functional materials, such that the functional material is transferred onto the imaging member or bias charge roller from the delivery member. Embodiments also pertain to an improved electrophotographic imaging member comprising a very thin outer layer on the imaging member surface, where the outer layer comprises functional materials, such as paraffin, that act as a lubricant and/or a barrier against moisture and/or surface contaminants. The improved imaging member exhibits improved xerographic performance, such as reduced torque, reduced friction, and deletions in high humidity conditions.

18 Claims, 8 Drawing Sheets

COMPOSITION FOR USE IN AN APPARATUS FOR DELIVERY OF A FUNCTIONAL MATERIAL TO AN IMAGE FORMING MEMBER

CROSS REFERENCE TO RELATED APPLICATIONS

Reference is made to commonly owned and co-pending, U.S. patent application Ser. No. 13/192,215 to Hu et al., filed the same day as the present application, entitled, "Apparatus and Methods for Delivery of a Functional Material to an Image Forming Member", the entire disclosure of which are incorporated herein by reference in its entirety.

BACKGROUND

The presently disclosed embodiments relate generally to layers that are useful in imaging apparatus members and components, for use in electrophotographic, including digital printing, apparatuses. More particularly, the embodiments pertain to an improved electrophotographic imaging member comprising a very thin outer layer on the imaging member surface, where the outer layer comprises functional materials that act as a lubricant and or a barrier against moisture and/or surface contaminants to address high torque and A-zone deletion. The very thin outer layer is applied to the imaging member on a nano-scale or molecular level. The improved imaging member exhibits improved xerographic performance, such as improved interaction with the blade cleaner and reduced image deletions in high humidity conditions. The embodiments also pertain to methods and systems for delivering the materials to the surface of the imaging member.

In electrophotographic or electrophotographic printing, the charge retentive surface, typically known as a photoreceptor, is electrostatically charged, and then exposed to a light pattern of an original image to selectively discharge the surface in accordance therewith. The resulting pattern of charged and discharged areas on the photoreceptor form an electrostatic charge pattern, known as a latent image, conforming to the original image. The latent image is developed by contacting it with a finely divided electrostatically attractable powder known as toner. Toner is held on the image areas by the electrostatic charge on the photoreceptor surface. Thus, a toner image is produced in conformity with a light image of the original being reproduced or printed. The toner image may then be transferred to a substrate or support member (e.g., paper) directly or through the use of an intermediate transfer member, and the image affixed thereto to form a permanent record of the image to be reproduced or printed. Subsequent to development, excess toner left on the charge retentive surface is cleaned from the surface. The process is useful for light lens copying from an original or printing electronically generated or stored originals such as with a raster output scanner (ROS), where a charged surface may be imagewise discharged in a variety of ways.

The described electrophotographic copying process is well known and is commonly used for light lens copying of an original document. Analogous processes also exist in other electrophotographic printing applications such as, for example, digital laser printing or ionographic printing and reproduction where charge is deposited on a charge retentive surface in response to electronically generated or stored images.

Scorotron has been employed to charge the surface of a photoreceptor. Alternatively, to charge the surface of a photoreceptor, a contact type charging device has been used, such as disclosed in U.S. Pat. No. 7,580,655, which is incorporated herein by reference. The contact type charging device, also termed "bias charge roll" (BCR) includes a conductive member which is supplied a voltage from a power source with a D.C. voltage superimposed with an A.C. voltage of no less than twice the level of the D.C. voltage. The charging device contacts the image bearing member (photoreceptor) surface, which is a member to be charged. The outer surface of the image bearing member is charged by contact with the BCR. The contact type charging device charges the image bearing member to a predetermined potential. Typically the contact type charger is in the form of a roll charger such as that disclosed in U.S. Pat. No. 4,387,980, which is incorporated herein by reference. Further, a vicinity type of charging roller may also be suitable to charge a photoreceptor surface, such as in U.S. Pat. No. 6,360,065, which is incorporated herein by reference.

Electrophotographic photoreceptors can be provided in a number of forms. For example, the photoreceptors can be a homogeneous layer of a single material, such as vitreous selenium, or it can be a composite layer containing a photoconductive layer and another material. In addition, the photoreceptor can be layered. Multilayered photoreceptors or imaging members have at least two layers, and may include a substrate, a conductive layer, an optional undercoat layer (sometimes referred to as a "charge blocking layer" or "hole blocking layer"), an optional adhesive layer, a photogenerating layer (sometimes referred to as a "charge generation layer," "charge generating layer," or "charge generator layer"), a charge transport layer, and an optional overcoating layer in either a flexible belt form or a rigid drum configuration. In the multilayer configuration, the active layers of the photoreceptor are the charge generation layer (CGL) and the charge transport layer (CTL). Enhancement of charge transport across these layers provides better photoreceptor performance. Multilayered flexible photoreceptor members may include an anti-curl layer on the backside of the substrate, opposite to the side of the electrically active layers, to render the desired photoreceptor flatness.

Conventional photoreceptors are disclosed in the following patents, a number of which describe the presence of light scattering particles in the undercoat layers: Yu, U.S. Pat. No. 5,660,961; Yu, U.S. Pat. No. 5,215,839; and Katayama et al, U.S. Pat. No. 5,958,638. The term "photoreceptor" or "photoconductor" is generally used interchangeably with the terms "imaging member." The term "electrophotographic" includes "electrophotographic" and "xerographic." The terms "charge transport molecule" are generally used interchangeably with the terms "hole transport molecule."

To further increase the service life of the photoreceptor, use of overcoat layers has also been implemented to protect photoreceptors and improve performance, such as wear resistance. However, these low-wear overcoats are associated with poor image quality due to A-zone deletion in a humid environment as the wear rates decrease to a certain level. In addition, high torque associated with low-wear overcoats in A-zone also cause severe issues with BCR charging systems, such as motor failure and blade damage. As a result, use of a low wear overcoat with BCR charging systems is still a big challenge, and there is a need to find a way to achieve the life target with overcoat technology in such systems.

SUMMARY

According to aspects illustrated herein, there is provided a delivery member for use in an image forming apparatus comprising: a support member and an elastomeric matrix disposed on the support member, wherein the elastomeric matrix comprises one or more functional materials dispersed within the matrix.

In another embodiment, there is provided an image forming apparatus comprising: a) an imaging member having a charge retentive-surface for developing an electrostatic latent image thereon, wherein the imaging member comprises: a substrate, and a photoconductive member disposed on the substrate; b) a charging unit for applying an electrostatic charge on the imaging member to a predetermined electric potential; and c) a delivery member disposed in contact with the surface of the imaging member or the surface of the charging unit, wherein the delivery member comprises: (i) a support member, and (ii) an elastomeric matrix disposed on the support member, wherein the elastomeric matrix comprises one or more functional materials dispersed within the matrix.

In yet further embodiments, there is provided a method for making the delivery member for use in an image forming apparatus comprising: mixing one or more functional materials into a polymer matrix prior to curing the polymer; depositing the mixture onto a support member to form an elastomeric matrix over the support member; and curing the elastomeric matrix over the support member to form the delivery member.

BRIEF DESCRIPTION OF THE DRAWINGS

For a better understanding, reference may be made to the accompanying figures.

DETAILED DESCRIPTION

Figure 1:
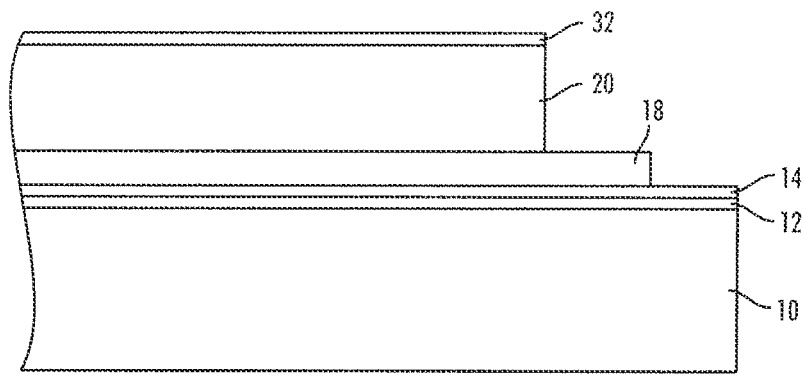
FIG. 1 is a cross-sectional view of an imaging member in a drum configuration according to the present embodiments.

In the following description, reference is made to the accompanying drawings, which form a part hereof and which illustrate several embodiments. It is understood that other embodiments may be used and structural and operational changes may be made without departure from the scope of the present disclosure.

The disclosed embodiments are directed generally to an improved electrophotographic imaging member comprising a very thin outer layer on the imaging member surface that comprises functional materials that act as a lubricant and or a barrier against moisture and/or surface contaminants. The outer layer imparts improved xerographic performance to imaging members incorporating such an outer layer, such as improved wear resistance, low friction, and reduced image defects due to deletion in high humidity conditions.

The embodiments also pertain to methods for making the improved electrophotographic imaging member using a delivery member for delivering the functional materials to the outer layer of an imaging surface. As used herein, "functional material" is a material that provides maintenance of desired photoreceptor function. For example, the functional material may be one that is continuously applied onto the photoreceptor surface through direct contact transfer and which can maintain the desired function(s) of the photoreceptor by providing continued lubrication and surface protection. Lubrication of the photoreceptor surface improves interaction with other components in a xerographic system, such as for example, the blade cleaner to reduce torque and blade damage. By maintaining a thin layer of surface material on the photoreceptor, the functional material also provides surface protection to prevent image deletion in, for example, a humid environment such as A-zone.

In the present embodiments, the delivery member is a roll implemented in an imaging forming apparatus, such as a customer replaceable unit (CRU) of a xerographic printing system, such that the delivery roll delivers functional materials to the outer layer, for example, an overcoat layer, of an imaging member or photoreceptor. The exemplary embodiments of this disclosure are described below with reference to the drawings. The specific terms are used in the following description for clarity, selected for illustration in the drawings and not to define or limit the scope of the disclosure. The same reference numerals are used to identify the same structure in different figures unless specified otherwise. The structures in the figures are not drawn according to their relative proportions and the drawings should not be interpreted as limiting the disclosure in size, relative size, or location. In addition, though the discussion will address negatively charged systems, the imaging members of the present disclosure may also be used in positively charged systems.

FIG. 1 is an exemplary embodiment of a multilayered electrophotographic imaging member or photoreceptor having a drum configuration. The substrate may further be in a cylinder configuration. As can be seen, the exemplary imaging member includes a rigid support substrate 10, an electrically conductive ground plane 12, an undercoat layer 14, a charge generation layer 18 and a charge transport layer 20. An optional overcoat layer 32 disposed on the charge transport layer may also be included. The rigid substrate may be comprised of a material selected from the group consisting of a metal, metal alloy, aluminum, zirconium, niobium, tantalum, vanadium, hafnium, titanium, nickel, stainless steel, chromium, tungsten, molybdenum, and mixtures thereof. The substrate may also comprise a material selected from the group consisting of a metal, a polymer, a glass, a ceramic, and wood.

The charge generation layer 18 and the charge transport layer 20 forms an imaging layer described here as two separate layers. In an alternative to what is shown in the figure, the charge generation layer may also be disposed on top of the charge transport layer. It will be appreciated that the functional components of these layers may alternatively be combined into a single layer.

Figure 2:
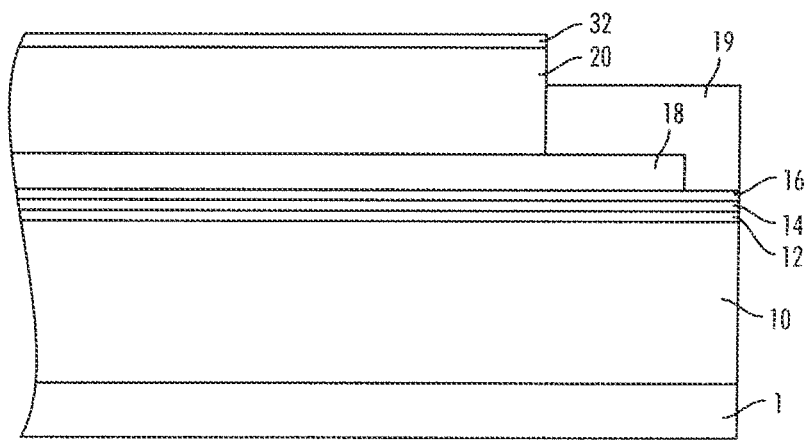
FIG. 2 is a cross-sectional view of an imaging member in a belt configuration according to the present embodiments.

FIG. 2 shows an imaging member or photoreceptor having a belt configuration according to the embodiments. As shown, the belt configuration is provided with an anti-curl back coating 1, a supporting substrate 10, an electrically conductive ground plane 12, an undercoat layer 14, an adhesive layer 16, a charge generation layer 18, and a charge transport layer 20. An optional overcoat layer 32 and ground strip 19 may also be included. An exemplary photoreceptor having a belt configuration is disclosed in U.S. Pat. No. 5,069,993, which is hereby incorporated by reference.

As discussed above, an electrophotographic imaging member generally comprises at least a substrate layer, an imaging layer disposed on the substrate and an optional overcoat layer disposed on the imaging layer. In further embodiments, the imaging layer comprises a charge generation layer disposed on the substrate and the charge transport layer disposed on the charge generation layer. In other embodiments, an undercoat layer may be included and is generally located between the substrate and the imaging layer, although additional layers may be present and located between these layers. The imaging member may also include anti-curl back coating layer in certain embodiments. The imaging member can be employed in the imaging process of electrophotography, where the surface of an electrophotographic plate, drum, belt or the like (imaging member or photoreceptor) containing a photoconductive insulating layer on a conductive layer is first uniformly electrostatically charged. The imaging member is then exposed to a pattern of activating electromagnetic radiation, such as light. The radiation selectively dissipates the charge on the illuminated areas of the photoconductive insulating layer while leaving behind an electrostatic latent image. This electrostatic latent image may then be developed to form a visible image by depositing charged particles of same or opposite polarity on the surface of the photoconductive insulating layer. The resulting visible image may then be transferred from the imaging member directly or indirectly (such as by a transfer or other member) to a print substrate, such as transparency or paper. The imaging process may be repeated many times with reusable imaging members.

Common print quality issues are strongly dependent on the quality and interaction of these photoreceptor layers. For example, when a photoreceptor is used in combination with a contact charger and a toner obtained by chemical polymerization (polymerization toner), image quality may be deteriorated due to a surface of the photoreceptor being stained with a discharge product produced in contact charging or the polymerization toner remaining after a transfer step. Still further, repetitive cycling causes the outermost layer of the photoreceptor to experience a high degree of frictional contact with other machine subsystem components used to clean and/or prepare the photoreceptor for imaging during each cycle. When repeatedly subjected to cyclic mechanical interactions against the machine subsystem components, photoreceptor belts can experience severe frictional wear at the outermost organic photoreceptor layer surface that can greatly reduce the useful life of the photoreceptor. Ultimately, the resulting wear impairs photoreceptor performance and thus image quality. Another type of common image defects is thought to result from the accumulation of charge somewhere in the photoreceptor. Consequently, when a sequential image is printed, the accumulated charge results in image density changes in the current printed image that reveals the previously printed image. In the xerographic process spatially varying amounts of positive charges from the transfer station find themselves on the photoreceptor surface. If this variation is large enough it will manifest itself as a variation in the image potential in the following xerographic cycle and print out as a defect.

A conventional approach to photoreceptor life extension is to apply an overcoat layer with wear resistance. For bias charge roller (BCR) charging systems, overcoat layers are associated with a trade-off between A-zone deletions (i.e. an image defect occurred in A-zone: 28° C., 85% RH) and photoreceptor wear rate. For example, most organic photoconductor (OPC) materials sets require a certain level of wear rate in order to suppress A-zone deletions. As a result, the life of a photoreceptor is limited by the wear rate in BCR charging systems. The present embodiments, however, have demonstrated a decrease in both wear rate and deletions. The present embodiments provide photoreceptor technology for both scorotron and BCR charging systems with a significantly extended life.

The present embodiments employ delivery members to deliver an ultra-thin layer of functional materials onto the photoreceptor surface to act as lubricant and or a barrier against moisture and surface contaminants and improve xerographic performance in high humidity conditions, such as for example, A-zone environment (28° C., 85% RH). The ultra-thin layer may be provided on a nano-scale or molecular level.

In embodiments, there is provided a method for controlled delivery of functional materials onto the surface of a photoreceptor by continuous delivery of the functional material to provide an ultra-thin layer of barrier against moisture and surface contaminants and improve xerographic performance in high humidity conditions (A-zone). From prior mechanistic studies, it has been demonstrated that A-zone deletion is caused by a number of occurrences, including, high energy charging which results in the formation of hydrophilic chemical species (e.g., —OH, —COOH) on the photoreceptor surface, water being physically absorbed on the hydrophilic photoreceptor surface in humid environment, and an increase in the surface conductivity of the photoreceptor due to the absorbed water layer and toner contaminants. Thus, to address these issues, the present embodiments disclose a controlled delivery of an ultra-thin layer of a functional material, such as a hydrophobic material, that can be applied directly to the photoreceptor surface continuously and is capable of preventing A-zone deletion for low-wear photoreceptors.

In embodiments, a functional material is continuously delivered on the photoreceptor to form an ultra-thin layer of lubricant to protect machine subsystem components, through reducing friction between the cleaning blade and the photoreceptor surface or at the contact interface between the photoreceptor surface and other relevant components. This lubricant further reduces the resultant torque and vibration so that the actuator and involved transmission mechanisms can move the photoreceptor or other relevant components in a smoother way. Therefore, the lubricant improves the printing image quality, which may be deteriorated due to aforementioned reasons, and further protects these components and extends theft service life.

Figure 3:
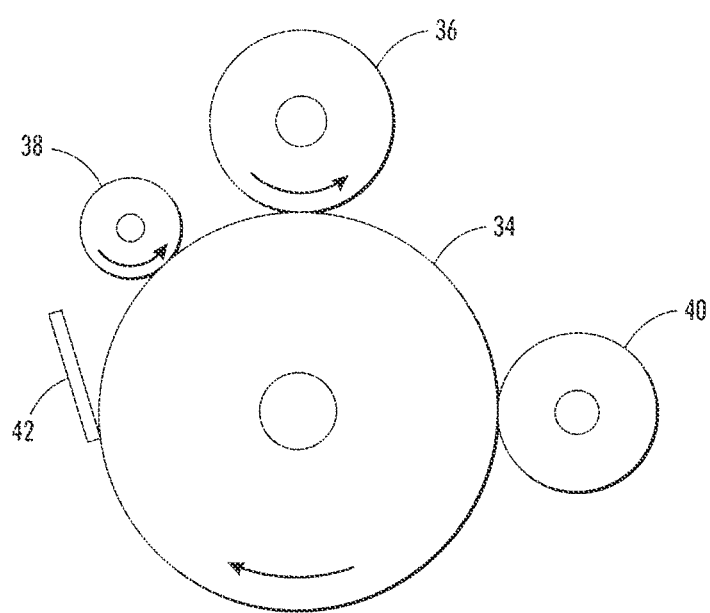
FIG. 3 is a cross-sectional view of a system implementing a delivery member in a customer replaceable unit (CRU) according to the present embodiments.
Figure 4:
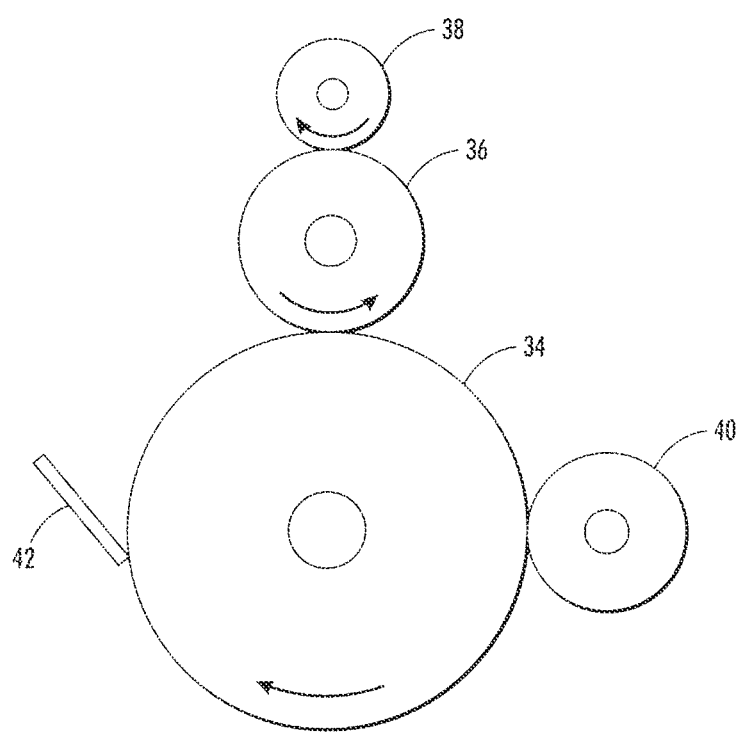
FIG. 4 is an alternative cross-sectional view of a system implementing a delivery member in a customer replaceable unit (CRU) according to the present embodiments.
Figure 5:
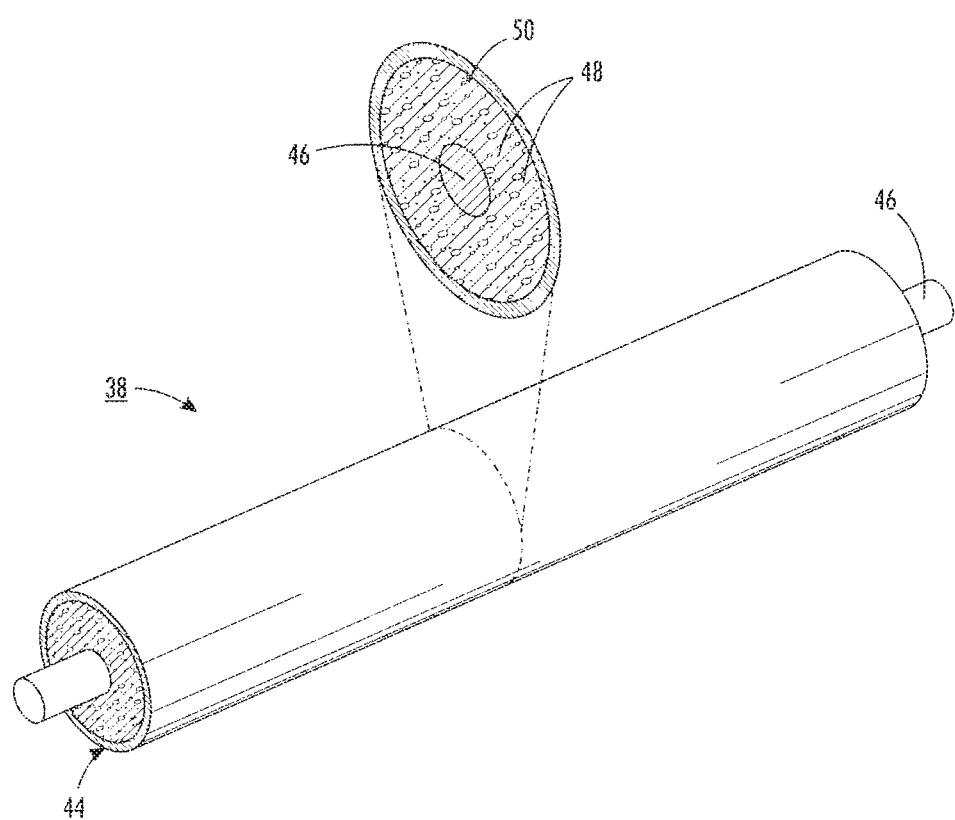
FIG. 5 is a side cross-sectional view of a delivery member for making an outer layer of an imaging member according to the present embodiments.

FIGS. 3-5 illustrate delivery members according to the present embodiments. In FIG. 3, there is illustrated an image-forming apparatus in a BCR charging system. As shown, the image-forming apparatus comprises a photoreceptor 34, a BCR 36 and a delivery member 38. The delivery member 38 contacts the photoreceptor 34 to deliver an ultra-thin layer of the functional material onto the surface of the photoreceptor 34. Subsequently, the photoreceptor 34 is substantially uniformly charged by the BCR 36 to initiate the electrophotographic reproduction process. The charged photoreceptor is then exposed to a light image to create an electrostatic latent image on the photoreceptive member (not shown). This latent image is subsequently developed into a visible image by a toner developer 40. Thereafter, the developed toner image is transferred from the photoreceptor member through a record medium to a copy sheet or some other image support substrate to which the image may be permanently affixed for producing a reproduction of the original document (not shown). The photoreceptor surface is generally then cleaned with a cleaner 42 to remove any residual developing material therefrom, in preparation for successive imaging cycles.

In an alternative configuration, as shown in FIG. 4, the delivery member 38 contacts the BCR 36 to deliver an ultra-thin layer of the functional material onto the surface of the BCR 36. The BCR 36, in turn, transfers the functional material onto the surface of the photoreceptor 34. The delivery member may be integrated into a xerographic printing system in various configurations and positions. As can be seen, as the overcoated photoreceptor drum 34 rotates, the delivery member 38 impregnated with the functional material delivers the functional materials to the surface of the overcoated photoreceptor 34 (FIG. 3), or to the surface of the BCR (FIG. 4), through contact diffusion. For example, the functional material dispersed therein can diffuse to the surface of the delivery member 38. As with the prior embodiment, the photoreceptor 34 is substantially uniformly charged by the BCR 36 to initiate the electrophotographic reproduction process. The charged photoreceptor is then exposed to a light image to create an electrostatic latent image on the photoreceptive member (not shown). This latent image is subsequently developed into a visible image by a toner developer 40. Thereafter, the developed toner image is transferred from the photoreceptor member through a record medium to a copy sheet or some other image support substrate to which the image may be permanently affixed for producing a reproduction of the original document (not shown). The photoreceptor surface is generally then cleaned with a cleaner 42 to remove any residual developing material therefrom, in preparation for successive imaging cycles.

FIG. 5 illustrates the delivery member 38 according to the present embodiments, and a cross-section thereof. The delivery member 38 comprises an elastomeric matrix 44 disposed around a support member 46. In embodiments, the support member 46 is a stainless steel rod. The support member can further comprise a material selected from the group consisting of metal, metal alloy, plastic, ceramic, and glass, and mixtures thereof. The diameter of the support member and the thickness of the elastomeric matrix may be varied depending on the application needs. In specific embodiments, the support member has a diameter of from about 3 mm to about 10 mm. In specific embodiments, the elastomeric matrix has a thickness of from about 20 µm to about 100 mm. In embodiments, the elastomeric matrix 44 may comprise functional materials 48 retained within a polymer matrix 50 such as a cross-linked silicone which forms a matrix that facilitates retention of the functional materials.

In the present embodiments, the functional material is integrated into the composition of the delivery member 38 and thus eliminates the need for a separate supply of materials within the system or the need to constantly reapplying the materials to the deliver member. Thus, the delivery member 36 serves the dual purpose of a reservoir and distributor of the functional material. In addition, the delivery members fabricated according to the present embodiments have shown to contain sufficient quantities of the functional material to continuously supply an ultra-thin layer of the functional material to the surface of the BCR/photoreceptor to extend the life of the photoreceptor.

In embodiments, the functional material can be an organic or inorganic compound, a monomer or polymer, or a mixture thereof. The functional material may also be selected from the group consisting of a lubricant material, a hydrophobic material, an oleophobic material, an amphiphilic material, and mixtures thereof. The functional materials may be in the form of liquid, wax, or gel, and a mixture thereof. In embodiments, the functional material is a paraffin, for example, one having a specific viscosity of 110-230 mPa·s. The functional material may also be selected from the group consisting of alkanes, fluoroalkanes, alkyl silanes, fluoroalkyl silanes alkoxy-silanes, mineral oil, synthetic oil, natural oil, and mixtures thereof. Illustrative examples of functional materials may include, for example, hydrophobic materials such as hydrocarbon compounds or polymers. The functional materials may further contain a functional group that facilitates adsorption of the functional materials on the photoreceptor surface, and optionally a reactive group that can chemically modify the photoreceptor surface. For examples, the functional materials may comprise paraffinic compound, alkyl alkoxy-silanes, or the mixture thereof.

In embodiments, the polymer matrix may be comprised of a polymer selected from the group consisting of polysiloxane, silicones, polyurethane, polyester, fluoro-silicone, polyolefin, fluoroelastomer, synthetic rubber, natural rubber and mixtures thereof.

In a specific embodiment, the elastomeric matrix 44 is composed of paraffin-impregnated silicone cast around the support member 46. The paraffin-impregnated silicone is prepared by mixing paraffin into a cross-linkable polydimethylsiloxane (PDMS) and then casting the mixture onto the support member 46 by use of a mold. Thereafter, the elastomeric matrix 44 is cured. After curing, the PDMS coated rod is extracted from the mold and may be further impregnated by immersion in a functional material, such as paraffin. In embodiments, the liquid cross-linkable PDMS is prepared from a two-component system, namely, a base agent and a curing agent. In further embodiments, the base agent and curing agent are present in a weight ratio of from about 50:1 to 2:1, or from about 20:1 to about 5:1. In embodiments, the functional material can be incorporated into the polymer matrix at a weight ratio of up to about 1:1, or from about 1:10 to about 1:2

The delivery member may be presented in a roll or have other configurations such as a web. The thickness of elastic materials may be varied, for example, from about 50 µm to about 100 mm, or from about 100 µm to about 10 mm. The delivery member may have a surface pattern comprising indentations or protrusions that have a three-dimensional shape selected from the group consisting of spheres, hemispheres, rods, polygons, and mixtures thereof.

In further embodiments, there is provided a photoreceptor made by the presently disclosed methods. For example, there is provided a photoreceptor comprising a substrate, an imaging layer disposed on the substrate, an overcoat layer disposed on the imaging layer, and an outer layer disposed on the overcoat layer, wherein the outer layer is formed by delivering a functional material to a surface of the overcoat layer, and further wherein the photoreceptor exhibits reduced wear rate, reduced friction, and minimized deletion as compared to a photoreceptor without the outer layer. In embodiments, the outer layer of functional materials has a thickness of from about 0.1 nm to about 1 um, or from about 25 nm to about 500 nm.

As discussed above, the functional material is delivered to the surface of the overcoat by contacting an elastomeric roller impregnated with the functional material to the surface of the overcoat layer. The diffusion of the functional material in the matrix of the elastomeric composition of the delivery member helps control the delivery rate of the functional material. Consequently, the delivered functional material forms an outer layer with a thickness on a nano- or molecular-level scale, providing both an economical method and avoiding contamination from excess functional materials on the photoreceptor and charging member. In embodiments, the outer layer may be applied directly to the imaging layer in place of the overcoat layer, or to the BCR which then transfers the functional material to the outerlayer of the photoreceptor.

In embodiments, the amount of hydrophobic functional material delivered onto the photoreceptor surface should be sufficient to retain the photoreceptor performance properties. The functional material can be present on the photoreceptor surface at various amount, for example, at a molecular level, or amount of from about 0.1 nanogram/cm$^2$ to about 1000 nanograms/cm$^2$, or from about 5 nanogram/cm$^2$ to about 100 nanogram/cm$^2$. The functional material can be present on the BCR surface at various amount, for example, from about 0.1 nanogram/cm$^2$ to about 1000 nanograms/cm$^2$, or from about 5 nanogram/cm$^2$ to about 100 nanogram/cm$^2$. The functional material can be delivered to the imaging member at a rate of from about 0.1 mg/kcycle to about 10 mg/kcycle. In the alternative, the functional material can be delivered to the BCR at a rate of from about 0.1 mg/kcycle to about 10 mg/kcycle. The present embodiments provide a photoreceptor that exhibits reduced torque, reduced wear rate and reduced A-Zone deletion as compared to a photoreceptor without the outer layer.

The Overcoat Layer

Other layers of the imaging member may include, for example, an optional over coat layer 32. An optional overcoat layer 32, if desired, may be disposed over the charge transport layer 20 to provide imaging member surface protection as well as improve resistance to abrasion. In embodiments, the overcoat layer 32 may have a thickness ranging from about 0.1 micrometer to about 25 micrometers or from about 1 micrometer to about 10 micrometers, or in a specific embodiment, about 3 micrometers to about 10 micrometers. These overcoat layers typically comprise a charge transport component and an optional organic polymer or inorganic polymer. These overcoat layers may include thermoplastic organic polymers or cross-linked polymers such as thermosetting resins, UV or e-beam cured resins, and the likes. The overcoat layers may further include a particulate additive such as metal oxides including aluminum oxide and silica, or low surface energy polytetrafluoroethylene (PTFE), and combinations thereof.

Any known or new overcoat materials may be included for the present embodiments. In embodiments, the overcoat layer may include a charge transport component or a cross-linked charge transport component. In particular embodiments, for example, the overcoat layer comprises a charge transport component comprised of a tertiary arylamine containing substituent capable of self cross-linking or reacting with the polymer resin to form a cured composition. Specific examples of charge transport component suitable for overcoat layer comprise the tertiary arylamine with a general formula of

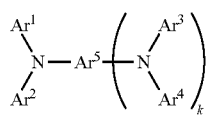

wherein $Ar^1$, $Ar^2$, $Ar^3$, and $Ar^4$ each independently represents an aryl group having about 6 to about 30 carbon atoms, $Ar^5$ represents aromatic hydrocarbon group having about 6 to about 30 carbon atoms, and k represents 0 or 1, and wherein at least one of $Ar^1$, $Ar^2$, $Ar^3$ $Ar^4$, and $Ar^5$ comprises a substituent selected from the group consisting of hydroxyl (—OH), a hydroxymethyl (—CH$_2$OH), an alkoxymethyl (—CH$_2$OR, wherein R is an alkyl having 1 to about 10 carbons), a hydroxylalkyl having 1 to about 10 carbons, and mixtures thereof. In other embodiments, $Ar^1$, $Ar^2$, $Ar^3$, and $Ar^4$ each independently represent a phenyl or a substituted phenyl group, and $Ar^5$ represents a biphenyl or a terphenyl group.

Additional examples of charge transport component which comprise a tertiary arylamine include the following:

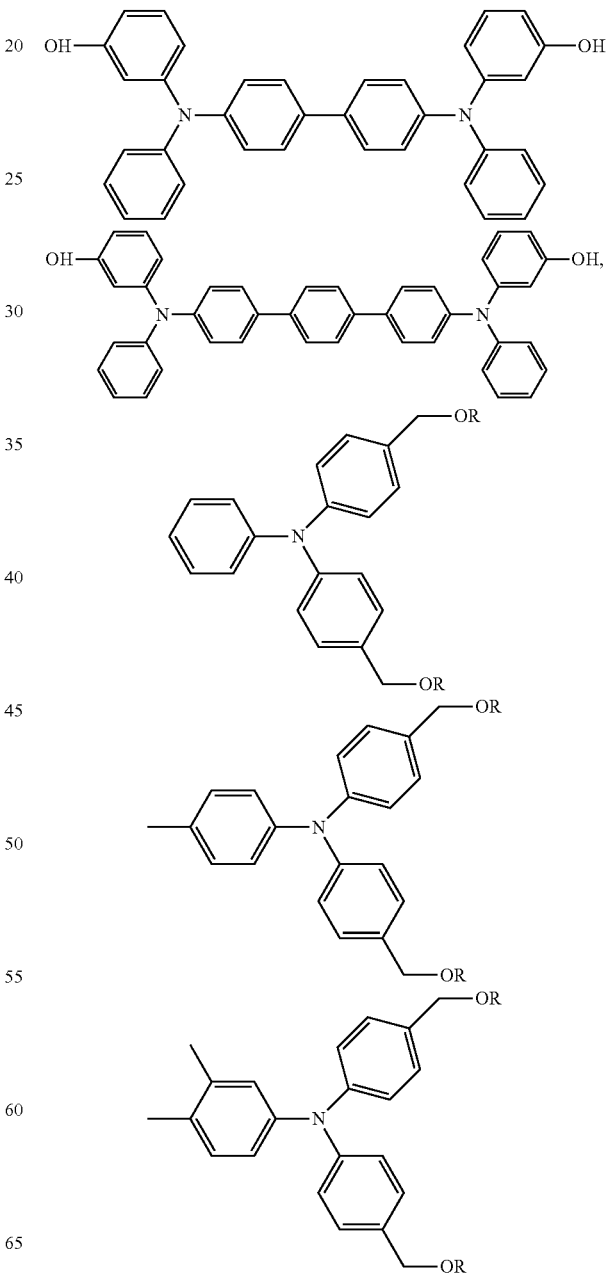

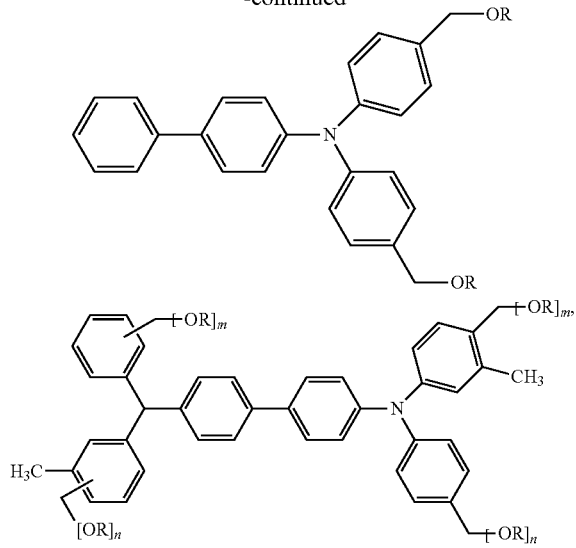

and the like, wherein R is a substituent selected from the group consisting of hydrogen atom, and an alkyl having from 1 to about 6 carbons, and in and n each independently represents 0 or 1, wherein m+n>1. In specific embodiments, the overcoat layer may include an additional curing agent to form a cured, crosslinked overcoat composition. Illustrative examples of the curing agent may be selected from the group consisting of a melamine-formaldehyde resin, a phenol resin, an isocyanate or a masking isocyanate compound, an acrylate resin, a polyol resin, or mixtures thereof. In embodiments, the crosslinked overcoat composition has an average modulus ranging from about 3 GPa to about 5 GPa, as measured by nano-indentation method using, for example, nanomechanical test instruments manufactured by Hysitron Inc. (Minneapolis, Minn.).

The Substrate

The photoreceptor support substrate 10 may be opaque or substantially transparent, and may comprise any suitable organic or inorganic material having the requisite mechanical properties. The entire substrate can comprise the same material as that in the electrically conductive surface, or the electrically conductive surface can be merely a coating on the substrate. Any suitable electrically conductive material can be employed, such as for example, metal or metal alloy. Electrically conductive materials include copper, brass, nickel, zinc, chromium, stainless steel, conductive plastics and rubbers, aluminum, semitransparent aluminum, steel, cadmium, silver, gold, zirconium, niobium, tantalum, vanadium, hafnium, titanium, nickel, niobium, stainless steel, chromium, tungsten, molybdenum, paper rendered conductive by the inclusion of a suitable material therein or through conditioning in a humid atmosphere to ensure the presence of sufficient water content to render the material conductive, indium, tin, metal oxides, including tin oxide and indium tin oxide, and the like. It could be single metallic compound or dual layers of different metals and/or oxides.

The substrate 10 can also be formulated entirely of an electrically conductive material, or it can be an insulating material including inorganic or organic polymeric materials, such as MYLAR, a commercially available biaxially oriented polyethylene terephthalate from DuPont, or polyethylene naphthalate available as KALEDEX 2000, with a ground plane layer 12 comprising a conductive titanium or titanium/zirconium coating, otherwise a layer of an organic or inorganic material having a semiconductive surface layer, such as indium tin oxide, aluminum, titanium, and the like, or exclusively be made up of a conductive material such as, aluminum, chromium, nickel, brass, other metals and the like. The thickness of the support substrate depends on numerous factors, including mechanical performance and economic considerations.

The substrate 10 may have a number of many different configurations, such as for example, a plate, a cylinder, a drum, a scroll, an endless flexible belt, and the like. In the case of the substrate being in the form of a belt, as shown in FIG. 2, the belt can be seamed or seamless. In embodiments, the photoreceptor herein is in a drum configuration.

The thickness of the substrate 10 depends on numerous factors, including flexibility, mechanical performance, and economic considerations. The thickness of the support substrate 10 of the present embodiments may be at least about 500 micrometers, or no more than about 3,000 micrometers, or be at least about 750 micrometers, or no more than about 2500 micrometers.

An exemplary substrate support 10 is not soluble in any of the solvents used in each coating layer solution, is optically transparent or semi-transparent, and is thermally stable up to a high temperature of about 150° C. A substrate support 10 used for imaging member fabrication may have a thermal contraction coefficient ranging from about $1\times10^{-5}$ per ° C. to about $3\times10^{-5}$ per ° C. and a Young's Modulus of between about $5\times10^{-5}$ psi ($3.5\times10^{-4}$ Kg/cm$^2$) and about $7\times10^{-5}$ psi ($4.9\times10^{-4}$ Kg/cm$^2$).

The Ground Plane

The electrically conductive ground plane 12 may be an electrically conductive metal layer which may be formed, for example, on the substrate 10 by any suitable coating technique, such as a vacuum depositing technique. Metals include aluminum, zirconium, niobium, tantalum, vanadium, hafnium, titanium, nickel, stainless steel, chromium, tungsten, molybdenum, and other conductive substances, and mixtures thereof. The conductive layer may vary in thickness over substantially wide ranges depending on the optical transparency and flexibility desired for the electrophotoconductive member. Accordingly, for a flexible photoresponsive imaging device, the thickness of the conductive layer may be at least about 20 Angstroms, or no more than about 750 Angstroms, or at least about 50 Angstroms, or no more than about 200 Angstroms for an optimum combination of electrical conductivity, flexibility and light transmission.

Regardless of the technique employed to form the metal layer, a thin layer of metal oxide forms on the outer surface of most metals upon exposure to air. Thus, when other layers overlying the metal layer are characterized as "contiguous" layers, it is intended that these overlying contiguous layers may, in fact, contact a thin metal oxide layer that has formed on the outer surface of the oxidizable metal layer. Generally, for rear erase exposure, a conductive layer light transparency of at least about 15 percent is desirable. The conductive layer need not be limited to metals. Other examples of conductive layers may be combinations of materials such as conductive indium tin oxide as transparent layer for light having a wavelength between about 4000 Angstroms and about 9000 Angstroms or a conductive carbon black dispersed in a polymeric binder as an opaque conductive layer.

The Hole Blocking Layer

After deposition of the electrically conductive ground plane layer, the hole blocking layer 14 may be applied thereto. Electron blocking layers for positively charged photoreceptors allow holes from the imaging surface of the photoreceptor to migrate toward the conductive layer. For negatively charged photoreceptors, any suitable hole blocking layer capable of forming a barrier to prevent hole injection from the conductive layer to the opposite photoconductive layer may be utilized. The hole blocking layer may include polymers such as polyvinylbutryral, epoxy resins, polyesters, polysiloxanes, polyamides, polyurethanes and the like, or may be nitrogen containing siloxanes or nitrogen containing titanium compounds such as trimethoxysilyl propylene diamine, hydrolyzed trimethoxysilyl propyl ethylene diamine, N-beta-(aminoethyl) gamma-aminopropyl trimethoxy silane, isopropyl 4-aminobenzene sulfonyl, di(dodecylbenzene sulfonyl) titanate, isopropyl di(4-aminobenzoyl)isostearoyl titanate, isopropyl tri(N-ethylamino-ethylamino)titanate, isopropyl trianthranil titanate, isopropyl tri(N,N-dimethylethylamino) titanate, titanium-4-amino benzene sulfonate oxyacetate, titanium 4-aminobenzoate isostearate oxyacetate, $[H_2N(CH_2)_4]CH_3Si(OCH_3)_2$, (gamma-aminobutyl)methyl diethoxysilane, and $[H_2N(CH_2)_3]CH_3Si(OCH_3)_2$ (gamma-aminopropyl)methyl diethoxysilane, as disclosed in U.S. Pat. Nos. 4,338,387, 4,286,033 and 4,291,110.

General embodiments of the undercoat layer may comprise a metal oxide and a resin binder. The metal oxides that can be used with the embodiments herein include, but are not limited to, titanium oxide, zinc oxide, tin oxide, aluminum oxide, silicon oxide, zirconium oxide, indium oxide, molybdenum oxide, and mixtures thereof. Undercoat layer binder materials may include, for example, polyesters, MOR-ESTER 49,000 from Morton International Inc., VITEL PE-100, VITEL PE-200, VITEL PE-200D, and VITEL PE-222 from Goodyear Tire and Rubber Co., polyarylates such as ARDEL from AMOCO Production Products, polysulfone from AMOCO Production Products, polyurethanes, and the like.

The hole blocking layer should be continuous and have a thickness of less than about 0.5 micrometer because greater thicknesses may lead to undesirably high residual voltage. A hole blocking layer of between about 0.005 micrometer and about 0.3 micrometer is used because charge neutralization after the exposure step is facilitated and optimum electrical performance is achieved. A thickness of between about 0.03 micrometer and about 0.06 micrometer is used for hole blocking layers for optimum electrical behavior. The hole blocking layers that contain metal oxides such as zinc oxide, titanium oxide, or tin oxide, may be thicker, for example, having a thickness up to about 25 micrometers. The blocking layer may be applied by any suitable conventional technique such as spraying, dip coating, draw bar coating, gravure coating, silk screening, air knife coating, reverse roll coating, vacuum deposition, chemical treatment and the like. For convenience in obtaining thin layers, the blocking layer is applied in the form of a dilute solution, with the solvent being removed after deposition of the coating by conventional techniques such as by vacuum, heating and the like. Generally, a weight ratio of hole blocking layer material and solvent of between about 0.05:100 to about 0.5:100 is satisfactory for spray coating.

The Charge Generation Layer

The charge generation layer 18 may thereafter be applied to the undercoat layer 14. Any suitable charge generation binder including a charge generating/photoconductive material, which may be in the form of particles and dispersed in a film forming binder, such as an inactive resin, may be utilized. Examples of charge generating materials include, for example, inorganic photoconductive materials such as amorphous selenium, trigonal selenium, and selenium alloys selected from the group consisting of selenium-tellurium, selenium-tellurium-arsenic, selenium arsenide and mixtures thereof, and organic photoconductive materials including various phthalocyanine pigments such as the X-form of metal free phthalocyanine, metal phthalocyanines such as vanadyl phthalocyanine and copper phthalocyanine, hydroxy gallium phthalocyanines, chlorogallium phthalocyanines, titanyl phthalocyanines, quinacridones, dibromo anthanthrone pigments, benzimidazole perylene, substituted 2,4-diamino-triazines, polynuclear aromatic quinones, enzimidazole perylene, and the like, and mixtures thereof, dispersed in a film forming polymeric binder. Selenium, selenium alloy, benzimidazole perylene, and the like and mixtures thereof may be formed as a continuous, homogeneous charge generation layer. Benzimidazole perylene compositions are well known and described, for example, in U.S. Pat. No. 4,587,189, the entire disclosure thereof being incorporated herein by reference. Multi-charge generation layer compositions may be used where a photoconductive layer enhances or reduces the properties of the charge generation layer. Other suitable charge generating materials known in the art may also be utilized, if desired. The charge generating materials selected should be sensitive to activating radiation having a wavelength between about 400 and about 900 nm during the imagewise radiation exposure step in an electrophotographic imaging process to form an electrostatic latent image. For example, hydroxygallium phthalocyanine absorbs light of a wavelength of from about 370 to about 950 nanometers, as disclosed, for example, in U.S. Pat. No. 5,756,245.

Any suitable inactive resin materials may be employed as a binder in the charge generation layer 18, including those described, for example, in U.S. Pat. No. 3,121,006, the entire disclosure thereof being incorporated herein by reference. Organic resinous binders include thermoplastic and thermosetting resins such as one or more of polycarbonates, polyesters, polyamides, polyurethanes, polystyrenes, polyarylethers, polyarylsulfones, polybutadienes, polysulfones, polyethersulfones, polyethylenes, polypropylenes, polyimides, polymethylpentenes, polyphenylene sulfides, polyvinyl butyral, polyvinyl acetate, polysiloxanes, polyacrylates, polyvinyl acetals, polyamides, polyimides, amino resins, phenylene oxide resins, terephthalic acid resins, epoxy resins, phenolic resins, polystyrene and acrylonitrile copolymers, polyvinylchloride, vinylchloride and vinyl acetate copolymers, acrylate copolymers, alkyd resins, cellulosic film formers, poly(amideimide), styrene-butadiene copolymers, vinylidenechloride/vinylchloride copolymers, vinylacetate/vinylidene chloride copolymers, styrene-alkyd resins, and the like. Another film-forming polymer binder is PCZ-400 (poly (4,4'-dihydroxy-diphenyl-1-1-cyclohexane) which has a viscosity-molecular weight of 40,000 and is available from Mitsubishi Gas Chemical Corporation (Tokyo, Japan).

The charge generating material can be present in the resinous binder composition in various amounts. Generally, at least about 5 percent by volume, or no more than about 90 percent by volume of the charge generating material is dispersed in at least about 95 percent by volume, or no more than about 10 percent by volume of the resinous binder, and more specifically at least about 20 percent, or no more than about 60 percent by volume of the charge generating material is dispersed in at least about 80 percent by volume, or no more than about 40 percent by volume of the resinous binder composition.

In specific embodiments, the charge generation layer 18 may have a thickness of at least about 0.1 µm, or no more than about 2 µm, or of at least about 0.2 µm, or no more than about 1 µm. These embodiments may be comprised of chlorogallium phthalocyanine or hydroxygallium phthalocyanine or mixtures thereof. The charge generation layer 18 containing the charge generating material and the resinous binder material generally ranges in thickness of at least about 0.1 µm, or no more than about 5 μm, for example, from about 0.2 μm to about 3 μm when dry. The charge generation layer thickness is generally related to binder content. Higher binder content compositions generally employ thicker layers for charge generation.

The Charge Transport Layer

In a drum photoreceptor, the charge transport layer comprises a single layer of the same composition. As such, the charge transport layer will be discussed specifically in terms of a single layer 20, but the details will be also applicable to an embodiment having dual charge transport layers. The charge transport layer 20 is thereafter applied over the charge generation layer 18 and may include any suitable transparent organic polymer or non-polymeric material capable of supporting the injection of photogenerated holes or electrons from the charge generation layer 18 and capable of allowing the transport of these holes/electrons through the charge transport layer to selectively discharge the surface charge on the imaging member surface. In one embodiment, the charge transport layer 20 not only serves to transport holes, but also protects the charge generation layer 18 from abrasion or chemical attack and may therefore extend the service life of the imaging member. The charge transport layer 20 can be a substantially non-photoconductive material, but one which supports the injection of photogenerated holes from the charge generation layer 18.

The layer 20 is normally transparent in a wavelength region in which the electrophotographic imaging member is to be used when exposure is affected there to ensure that most of the incident radiation is utilized by the underlying charge generation layer 18. The charge transport layer should exhibit excellent optical transparency with negligible light absorption and no charge generation when exposed to a wavelength of light useful in xerography, e.g., 400 to 900 nanometers. In the case when the photoreceptor is prepared with the use of a transparent substrate 10 and also a transparent or partially transparent conductive layer 12, image wise exposure or erase may be accomplished through the substrate 10 with all light passing through the back side of the substrate. In this case, the materials of the layer 20 need not transmit light in the wavelength region of use if the charge generation layer 18 is sandwiched between the substrate and the charge transport layer 20. The charge transport layer 20 in conjunction with the charge generation layer 18 is an insulator to the extent that an electrostatic charge placed on the charge transport layer is not conducted in the absence of illumination. The charge transport layer 20 should trap minimal charges as the charge passes through it during the discharging process.

The charge transport layer 20 may include any suitable charge transport component or activating compound useful as an additive dissolved or molecularly dispersed in an electrically inactive polymeric material, such as a polycarbonate binder, to form a solid solution and thereby making this material electrically active. "Dissolved" refers, for example, to forming a solution in which the small molecule is dissolved in the polymer to form a homogeneous phase; and molecularly dispersed in embodiments refers, for example, to charge transporting molecules dispersed in the polymer, the small molecules being dispersed in the polymer on a molecular scale. The charge transport component may be added to a film forming polymeric material which is otherwise incapable of supporting the injection of photogenerated holes from the charge generation material and incapable of allowing the transport of these holes through. This addition converts the electrically inactive polymeric material to a material capable of supporting the injection of photogenerated holes from the charge generation layer 18 and capable of allowing the transport of these holes through the charge transport layer 20 in order to discharge the surface charge on the charge transport layer. The high mobility charge transport component may comprise small molecules of an organic compound which cooperate to transport charge between molecules and ultimately to the surface of the charge transport layer. For example, but not limited to, N,N'-diphenyl-N,N-bis(3-methyl phenyl)-1,1'-biphenyl-4,4'-diamine (TPD), other arylamines like triphenyl amine, N,N,N',N'-tetra-p-tolyl-1,1'-biphenyl-4, 4'-diamine (TM-TPD), and the like.

A number of charge transport compounds can be included in the charge transport layer, which layer generally is of a thickness of from about 5 to about 75 micrometers, and more specifically, of a thickness of from about 15 to about 40 micrometers. Examples of charge transport components are aryl amines of the following formulas/structures:

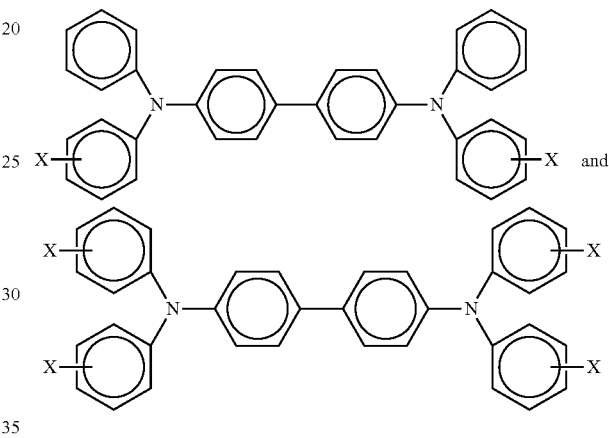

wherein X is a suitable hydrocarbon like alkyl, alkoxy, aryl, and derivatives thereof; a halogen, or mixtures thereof, and especially those substituents selected from the group consisting of Cl and $CH_3$; and molecules of the following formulas

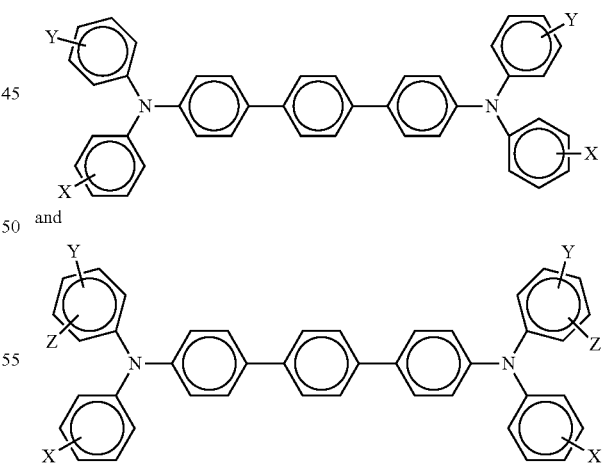

wherein X, Y and Z are independently alkyl, alkoxy, aryl, a halogen, or mixtures thereof, and wherein at least one of Y and Z are present.

Alkyl and alkoxy contain, for example, from 1 to about 25 carbon atoms, and more specifically, from 1 to about 12 carbon atoms, such as methyl, ethyl, propyl, butyl, pentyl, and the corresponding alkoxides. Aryl can contain from 6 to about 36 carbon atoms, such as phenyl, and the like. Halogen includes chloride, bromide, iodide, and fluoride. Substituted alkyls, alkoxys, and aryls can also be selected in embodiments.

Examples of specific aryl amines that can be selected for the charge transport layer include N,N'-diphenyl-N,N'-bis(alkylphenyl)-1,1'-biphenyl-4,4'-diamine wherein alkyl is selected from the group consisting of methyl, ethyl, propyl, butyl, hexyl, and the like; N,N'-diphenyl-N,N'-bis(halophenyl)-1,1'-biphenyl-4,4'-diamine wherein the halo substituent is a chloro substituent; N,N'-bis(4-butylphenyl)-N,N'-di-p-tolyl-[p-terphenyl]-4,4"-diamine, N,N'-bis(4-butylphenyl)-N,N'-di-m-tolyl-[p-terphenyl]-4,4"-diamine, N,N'-bis(4-butylphenyl)-N,N'-di-o-tolyl-[p-terphenyl]-4,4"-diamine, N,N'-bis(4-butylphenyl)-N,N'-bis-(4-isopropylphenyl)-[p-terphenyl]-4,4"-diamine, N,N'-bis(4-butylphenyl)-N,N'-bis-(2-ethyl-6-methylphenyl)-[p-terphenyl]-4,4"-diamine, N,N'-bis(4-butylphenyl)-N,N'-bis-(2,5-dimethylphenyl)-[p-terphenyl]-4,4'-diamine, N,N'-diphenyl-N,N'-bis(3-chlorophenyl)-[p-terphenyl]-4,4"-diamine, and the like. Other known charge transport layer molecules may be selected in embodiments, reference for example, U.S. Pat. Nos. 4,921,773 and 4,464,450, the disclosures of which are totally incorporated herein by reference.

Examples of the binder materials selected for the charge transport layers include components, such as those described in U.S. Pat. No. 3,121,006, the disclosure of which is totally incorporated herein by reference. Specific examples of polymer binder materials include polycarbonates, polyarylates, acrylate polymers, vinyl polymers, cellulose polymers, polyesters, polysiloxanes, polyamides, polyurethanes, poly(cyclo olefins), and epoxies, and random or alternating copolymers thereof. In embodiments, the charge transport layer, such as a hole transport layer, may have a thickness of at least about 10 µm, or no more than about 40 µm.

Examples of components or materials optionally incorporated into the charge transport layers or at least one charge transport layer to, for example, enable improved lateral charge migration (LCM) resistance include hindered phenolic antioxidants such as tetrakis methylene(3,5-di-tert-butyl-4-hydroxy hydrocinnamate) methane (IRGANOX® 1010, available from Ciba Specialty Chemical), butylated hydroxytoluene (BHT), and other hindered phenolic antioxidants including SUMILIZER™ BHT-R, MDP-S, BBM-S, WX-R, NR, BP-76, BP-101, GA-80, GM and GS (available from Sumitomo Chemical Co., Ltd.), IRGANOX® 1035, 1076, 1098, 1135, 1141, 1222, 1330, 1425WL, 1520L, 245, 259, 3114, 3790, 5057 and 565 (available from Ciba Specialties Chemicals), and ADEKA STAB™ AO-20, AO-30, AO-40, AO-50, AO-60, AO-70, AO-80 and AO-330 (available from Asahi Denka Co., Ltd.); hindered amine antioxidants such as SANOL™ LS-2626, LS-765, LS-770 and LS-744 (available from SANKYO CO. Ltd.), TINUVIN® 144 and 622LD (available from Ciba Specialties Chemicals), MARK™ LA57, LA67, LA62, LA68 and LA63 (available from Asahi Denka Co., Ltd.), and SUMILIZER® TPS (available from Sumitomo Chemical Co., Ltd.); thioether antioxidants such as SUMILIZER® TP-D (available from Sumitomo Chemical Co., Ltd); phosphite antioxidants such as MARK™ 2112, PEP-8, PEP-24G, PEP-36, 329K and HP-10 (available from Asahi Denka Co., Ltd.); other molecules such as bis(4-diethylamino-2-methylphenyl)phenylmethane (BDETPM), bis[2-methyl-4-(N-2-hydroxyethyl-N-ethyl-aminophenyl)]-phenylmethane (DHTPM), and the like. The weight percent of the antioxidant in at least one of the charge transport layer is from about 0 to about 20, from about 1 to about 10, or from about 3 to about 8 weight percent.

The charge transport layer should be an insulator to the extent that the electrostatic charge placed on the hole transport layer is not conducted in the absence of illumination at a rate sufficient to prevent formation and retention of an electrostatic latent image thereon. The charge transport layer is substantially nonabsorbing to visible light or radiation in the region of intended use, but is electrically "active" in that it allows the injection of photogenerated holes from the photoconductive layer, that is the charge generation layer, and allows these holes to be transported through itself to selectively discharge a surface charge on the surface of the active layer.

In addition, in the present embodiments using a belt configuration, the charge transport layer may consist of a single pass charge transport layer or a dual pass charge transport layer (or dual layer charge transport layer) with the same or different transport molecule ratios. In these embodiments, the dual layer charge transport layer has a total thickness of from about 10 µm to about 40 µm. In other embodiments, each layer of the dual layer charge transport layer may have an individual thickness of from 2 µm to about 20 µm. Moreover, the charge transport layer may be configured such that it is used as a top layer of the photoreceptor to inhibit crystallization at the interface of the charge transport layer and the overcoat layer. In another embodiment, the charge transport layer may be configured such that it is used as a first pass charge transport layer to inhibit microcrystallization occurring at the interface between the first pass and second pass layers.

Any suitable and conventional technique may be utilized to form and thereafter apply the charge transport layer mixture to the supporting substrate layer. The charge transport layer may be formed in a single coating step or in multiple coating steps. Dip coating, ring coating, spray, gravure or any other drum coating methods may be used.

Drying of the deposited coating may be effected by any suitable conventional technique such as oven drying, infra red radiation drying, air drying and the like. The thickness of the charge transport layer after drying is from about 10 µm to about 40 µm or from about 12 µm to about 36 µm for optimum photoelectrical and mechanical results. In another embodiment the thickness is from about 14 µm to about 36 µm.

The Adhesive Layer

An optional separate adhesive interface layer may be provided in certain configurations, such as for example, in flexible web configurations. In the embodiment illustrated in FIG. 1, the interface layer would be situated between the blocking layer 14 and the charge generation layer 18. The interface layer may include a copolyester resin. Exemplary polyester resins which may be utilized for the interface layer include polyarylatepolyvinylbutyrals, such as ARDEL POLYARYLATE (U-100) commercially available from Toyota Hsutsu Inc., VITEL PE-100, VITEL PE-200, VITEL PE-200D, and VITEL PE-222, all from Bostik, 49,000 polyester from Rohm Hass, polyvinyl butyral, and the like. The adhesive interface layer may be applied directly to the hole blocking layer 14. Thus, the adhesive interface layer in embodiments is in direct contiguous contact with both the underlying hole blocking layer 14 and the overlying charge generator layer 18 to enhance adhesion bonding to provide linkage. In yet other embodiments, the adhesive interface layer is entirely omitted.

Any suitable solvent or solvent mixtures may be employed to form a coating solution of the polyester for the adhesive interface layer. Solvents may include tetrahydrofuran, toluene, monochlorobenzene, methylene chloride, cyclohexanone, and the like, and mixtures thereof. Any other suitable and conventional technique may be used to mix and thereafter apply the adhesive layer coating mixture to the hole blocking layer. Application techniques may include spraying, dip coating, roll coating, wire wound rod coating, and the like. Drying of the deposited wet coating may be effected by any suitable conventional process, such as oven drying, infra red radiation drying, air drying, and the like.

The adhesive interface layer may have a thickness of at least about 0.01 micrometers, or no more than about 900 micrometers after drying. In embodiments, the dried thickness is from about 0.03 micrometers to about 1 micrometer.

The Ground Strip

The ground strip may comprise a film forming polymer binder and electrically conductive particles. Any suitable electrically conductive particles may be used in the electrically conductive ground strip layer 19. The ground strip 19 may comprise materials which include those enumerated in U.S. Pat. No. 4,664,995. Electrically conductive particles include carbon black, graphite, copper, silver, gold, nickel, tantalum, chromium, zirconium, vanadium, niobium, indium tin oxide and the like. The electrically conductive particles may have any suitable shape. Shapes may include irregular, granular, spherical, elliptical, cubic, flake, filament, and the like. The electrically conductive particles should have a particle size less than the thickness of the electrically conductive ground strip layer to avoid an electrically conductive ground strip layer having an excessively irregular outer surface. An average particle size of less than about 10 micrometers generally avoids excessive protrusion of the electrically conductive particles at the outer surface of the dried ground strip layer and ensures relatively uniform dispersion of the particles throughout the matrix of the dried ground strip layer. The concentration of the conductive particles to be used in the ground strip depends on factors such as the conductivity of the specific conductive particles utilized.

The ground strip layer may have a thickness of at least about 7 micrometers, or no more than about 42 micrometers, or of at least about 14 micrometers, or no more than about 27 micrometers.

The Anti-Curl Back Coating Layer

The anti-curl back coating 1 may comprise organic polymers or inorganic polymers that are electrically insulating or slightly semi-conductive. The anti-curl back coating provides flatness and/or abrasion resistance.

Anti-curl back coating 1 may be formed at the back side of the substrate 2, opposite to the imaging layers. The anti-curl back coating may comprise a film forming resin binder and an adhesion promoter additive. The resin binder may be the same resins as the resin binders of the charge transport layer discussed above. Examples of film forming resins include polyacrylate, polystyrene, bisphenol polycarbonate, poly(4,4'-isopropylidene diphenyl carbonate), 4,4'-cyclohexylidene diphenyl polycarbonate, and the like. Adhesion promoters used as additives include 49,000 (du Pont), Vitel PE-100, Vitel PE-200, Vitel PE-307 (Goodyear), and the like. Usually from about 1 to about 15 weight percent adhesion promoter is selected for film forming resin addition. The thickness of the anti-curl back coating is at least about 3 micrometers, or no more than about 35 micrometers, or about 14 micrometers.

Various exemplary embodiments encompassed herein include a method of imaging which includes generating an electrostatic latent image on an imaging member, developing a latent image, and transferring the developed electrostatic image to a suitable substrate.

While the description above refers to particular embodiments, it will be understood that many modifications may be made without departing from the spirit thereof. The accompanying claims are intended to cover such modifications as would fall within the true scope and spirit of embodiments herein.

The presently disclosed embodiments are, therefore, to be considered in all respects as illustrative and not restrictive, the scope of embodiments being indicated by the appended claims rather than the foregoing description. All changes that come within the meaning of and range of equivalency of the claims are intended to be embraced therein.

EXAMPLES

The example set forth herein below and is illustrative of different compositions and conditions that can be used in practicing the present embodiments. All proportions are by weight unless otherwise indicated. It will be apparent, however, that the embodiments can be practiced with many types of compositions and can have many different uses in accordance with the disclosure above and as pointed out hereinafter.

Example 1

Fabrication of Delivery Members

A crosslinkable polydimethylsiloxane (PDMS) base and curing agent (Sylgard 184 Dow Corning) were mixed together in a 10:1 ratio by mass. The components were stirred together. To this mixture was added paraffin oil in a ratio of 2:1 PDMS to paraffin oil. The mixture was stirred together until a viscous mixture was obtained. The mixture was injected into a cylindrical mold, and degassed for one hour. The remaining mold was assembled and the PDMS:paraffin mixture was cured in a forced air lab oven at 60° C. for three hours. The delivery roller was extracted from the mold and incorporated into a CRU for print testing.

Example 2

Fabrication of Image-Forming Apparatus

A delivery member, as fabricated according to Example 1, was incorporated into a Xerox DC250 printer CRU in a space between the cleaning blade and the BCR charging roller. The delivery roller was in direct contact with the photoreceptor. The modified CRU included a low wear overcoated photoreceptor.

The photoreceptor was fabricated in the following manner. A coating solution for an undercoat layer comprising 100 parts of a ziconium compound (trade name: Orgatics ZC540), 10 parts of a silane compound (trade name: A110, manufactured by Nippon Unicar Co., Ltd), 400 parts of isopropanol solution and 200 parts of butanol was prepared. The coating solution was applied onto a 30-mm cylindrical aluminum (Al) substrate subjected to honing treatment by dip coating, and dried by heating at 150° C. for 10 minutes to form an undercoat layer having a film thickness of 0.1 micrometer.

A 0.5 micron thick charge generating layer was subsequently dip coated on top of the undercoat layer from a dispersion of Type V hydroxygallium phthalocyanine (12 parts), alkylhydroxy gallium phthalocyanine (3 parts), and a vinyl chloride/vinyl acetate copolymer, VMCH (Mn=27,000, about 86 weight percent of vinyl chloride, about 13 weight percent of vinyl acetate and about 1 weight percent of maleic acid) available from Dow Chemical (10 parts), in 475 parts of n-butylacetate.

Subsequently, a 20 μm thick charge transport layer (CTL) was dip coated on top of the charge generating layer from a solution of N,N'-diphenyl-N,N'-bis(3-methylphenyl)-1,1'-biphenyl-4,4'-diamine (82.3 parts), 2.1 parts of 2,6-di-tert-butyl-4-methylphenol (BHT) from Aldrich and a polycarbonate. PCZ-400 [poly(4,4'-dihydroxy-diphenyl-1-1-cyclohexane), $M_w$=40,000] available from Mitsubishi Gas Chemical Company, Ltd. (123.5 parts) in a mixture of 546 parts of tetrahydrofuran (THF) and 234 parts of monochlorobenzene. The CTL was dried at 115° C. for 60 minutes.

An overcoat coating solution was prepared from melamine-formaldehyde resin (3.3 parts), N,N'-diphenyl-N,N'-bis(3-hydroxyphenyl)-[1,1'-biphenyl]-4,4'-diamine (DHTBD) (6.0 parts), and an acid catalyst (0.1 part) in an alcohol solvent. After filtering with a 0.45 μm PTFE filter, the solution was applied onto the photoreceptor surface and more specifically onto the charge transport layer using cup coating technique, followed by thermal curing at 150° C. for 40 minutes to form an overcoat layer having a film thickness of 5 μm.

Figure 6:
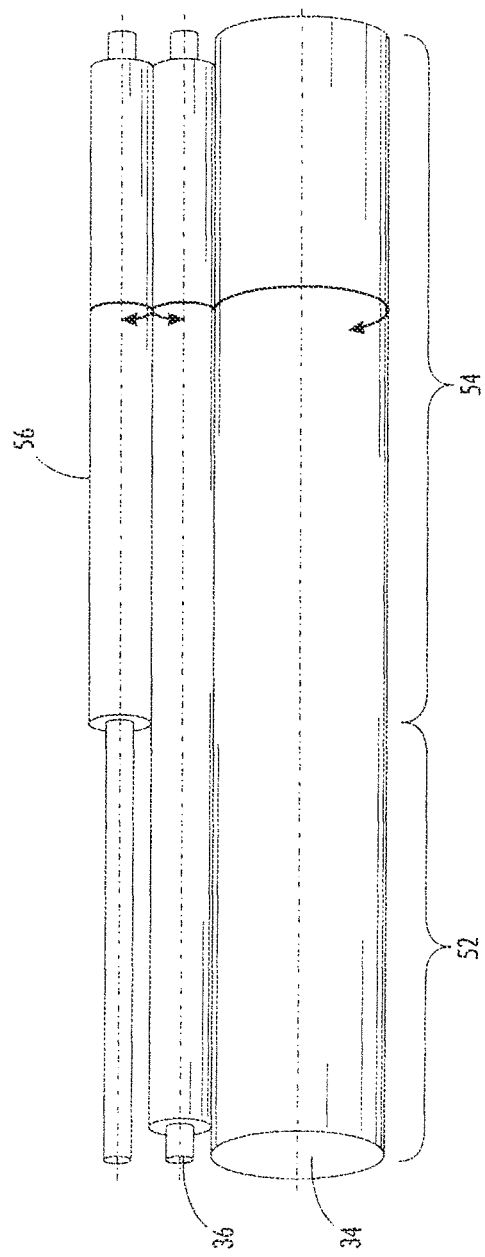
FIG. 6 illustrates a test image-forming apparatus according to the present embodiments.

Evaluation and Testing Results
Print Test:

The photoreceptor was conditioned in A-zone (28° C., 85% RH) before machine testing. The print test was performed with a Xerox DC250 printer in A-Zone to evaluate image quality, specifically halftone and deletion. For comparison, and seen in FIG. 6, paraffin was only applied onto two thirds 54 of photoreceptor 34 and the non-applied surface 52 was used as control. This was achieved by fabricating the delivery member 56 to be only ⅔ the width of the photoreceptor and setting it to the inboard side of the CRU. The delivery member 56 was in direct contact with the photoreceptor 34. The print test was continued for 125 kcycles and diagnostic prints were printed every 2 k prints. Good image quality was demonstrated.

Figure 7:
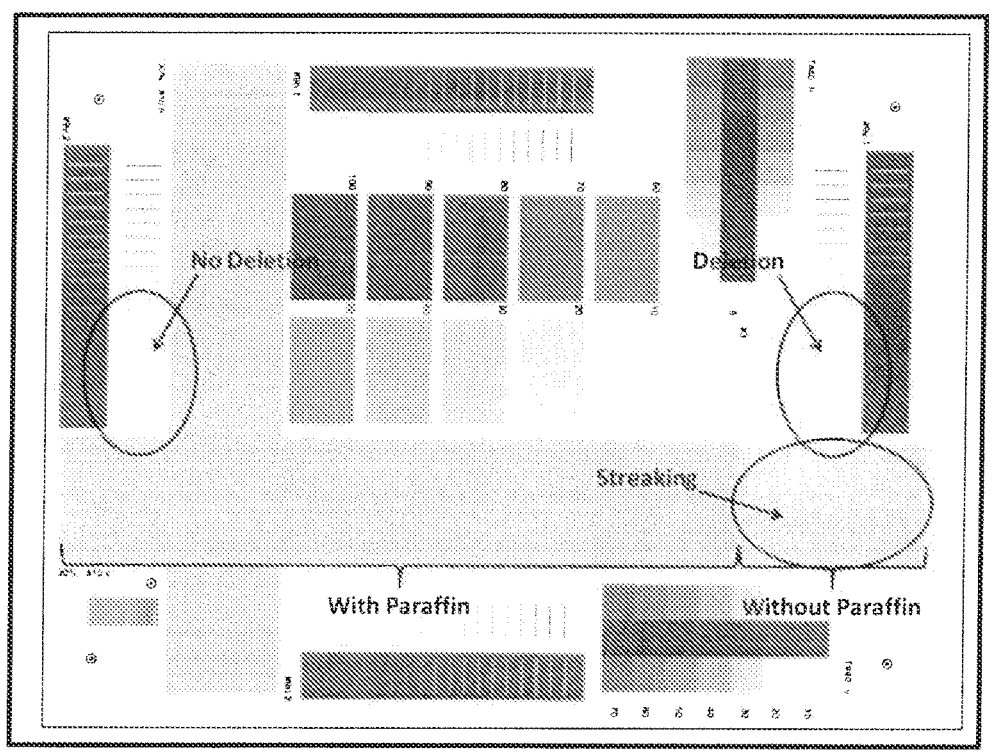
FIG. 7 is a print test demonstrating A-zone deletion results of prints made with the system of FIG. 3 as compared to those made with a control system (without use of delivery member with functional materials)
Figure 8:
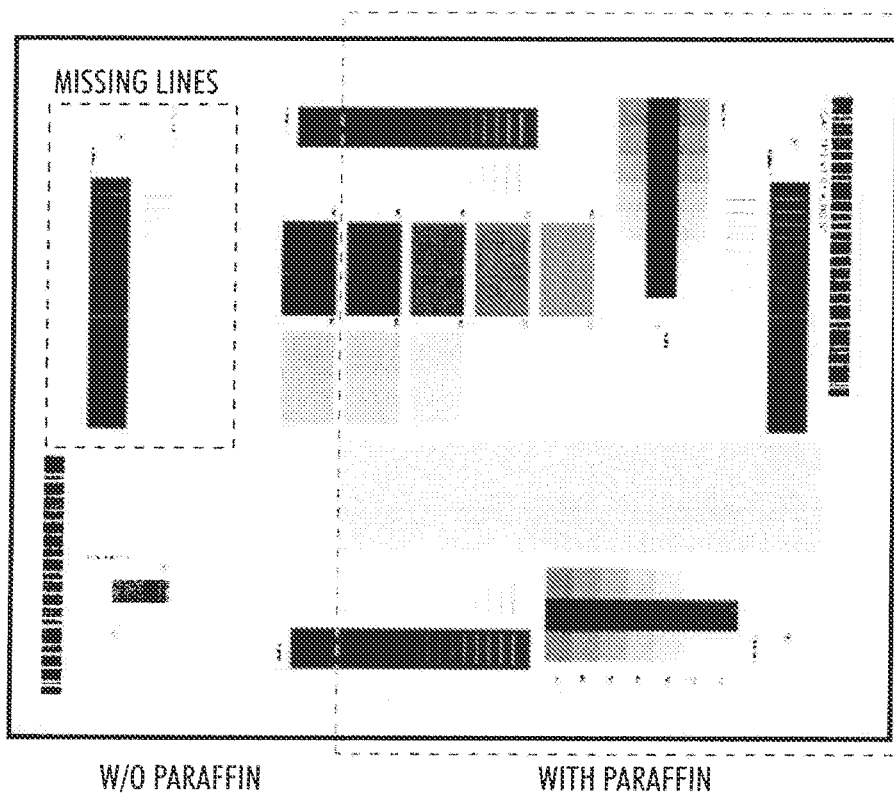
FIG. 8 is a print test demonstrating A-zone deletion results of prints made with the system of FIG. 4 as compared to those made with a control system (without use of delivery member with functional materials)

Print results obtained from the print test machine after 32500 prints are shown in FIG. 7 (using the system of FIG. 3) and FIG. 8 (using the system of FIG. 4) (50000 prints (125 kcycles) were completed), which show there was a dramatic improvement in image quality developed from the paraffin-applied photoreceptor surface area (no deletion observed), as compared to the control section. The section developed from paraffin-coated photoreceptor shows no defects in the image, whereas the section without paraffin applied shows both A-zone deletion and streaking. The lack of defects in the paraffin section indicated that there were no adverse affects to the electrical properties of the photoreceptor. From observation, the portion of the cleaning blade that contacted the control portion 52 of the photoreceptor (without paraffin applied) exhibited partial damage on the leading edge. In comparison, the test portion of the photoreceptor 54 (with paraffin applied) exhibited much less damage.

Figure 9:
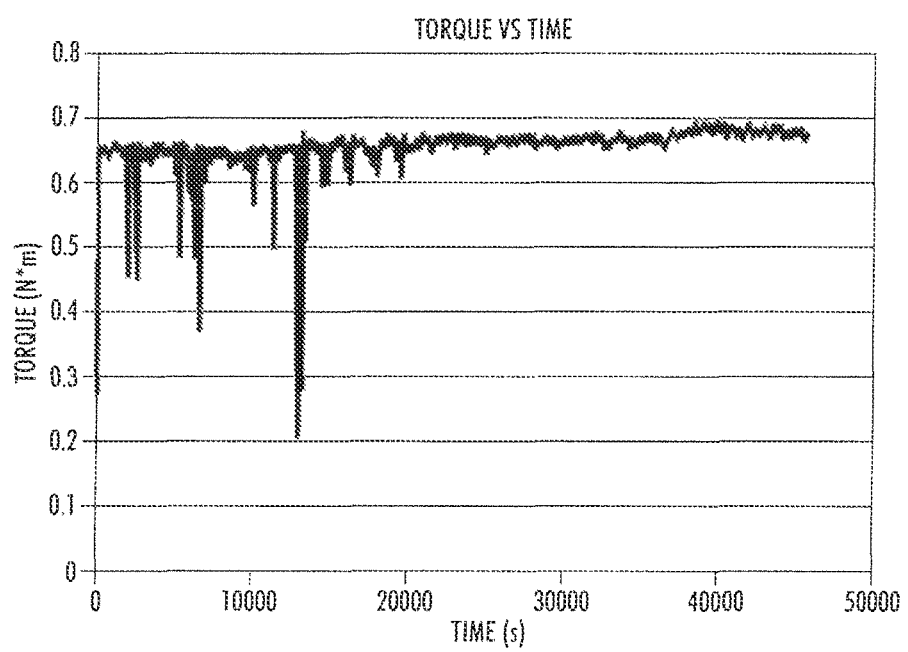
FIG. 9 is a graph depicting a comparison of torque in A-zone between a printing system made according to the present embodiments and a control.

Torque Measurements:

The torque of a xerographic cartridge was measured with a Fuji Xerox drum/toner cartridge "F469" using an in-house fixture that was set up to mimic a xerographic process with BCR charging as Fuji Xerox "DocuCentre" printers. The measurements were carried in a stressfully humid environment (temperature 28° C.; humidity: 85%). The photoreceptor without an overcoat showed stable torque with an average of about 0.78 N·m. The torque measured using a photoreceptor coated with the overcoat layer as described in Example 2 was over 1.0 N·m. Blade failure with overcoat layer drums occurred before 5000 cycles. FIG. 9 displays the torque obtained from an overcoated photoreceptor in conjunction with a 2:1 PDMS:paraffin roller for 100 kcycles (400 kcycles were completed in this experiment). The torque measured at about 0.651 N·m.

In summary, the present embodiments describe a method and apparatus for delivering a continuous supply of functional material that represents a breakthrough approach toward the goal of long-life photoreceptors by substantially reducing torque and image defects. The method and apparatus uses only a delivery member fabricated with the functional materials, thus eliminating the need for a separate supply container. The delivery method and apparatus is compact in size and can be implemented in a small CRU, such as for example, a CRU having 40 mm drum diameter. Alternatively, the present embodiments can also deliver the ultra-thin layer of functional material by the delivery member onto the photoreceptor by using the BOA as an intermediate donor roller.

All the patents and applications referred to herein are hereby specifically, and totally incorporated herein by reference in their entirety in the instant specification.

It will be appreciated that several of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims. Unless specifically recited in a claim, steps or components of claims should not be implied or imported from the specification or any other claims as to any particular order, number, position, size, shape, angle, color, or material.

What is claimed is:

1. A delivery member system for use in an image forming apparatus comprising:
   an imaging member, the imaging member including:
      a substrate,
      an imaging layer disposed on the substrate,
      an overcoat layer disposed on the imaging layer, and
   a delivery member, the delivery member including:
      a support member, and
      an elastomeric matrix disposed on the support member, wherein the elastomeric matrix comprises one or more functional materials dispersed within the matrix, wherein the functional material is delivered from the elastomeric matrix, transferred to the imaging member and forms an outer layer on a surface of the overcoat layer and the outer layer is disposed on the overcoat layer.

2. The delivery member system of claim 1, wherein the elastomeric matrix has a thickness of from about 0.1 mm to about 100 mm.

3. The delivery member system of claim 1, wherein the elastomeric matrix comprises a polymer selected from the group consisting of polysiloxane, polyurethane, polyester, polyfluorosilioxanes, polyolefin, fluoroelastomer, synthetic rubber, natural rubber, and mixtures thereof.

4. The delivery member system of claim 1, wherein the elastomeric matrix comprises a cross-linked polydimethylsiloxane (PDMS).

5. The delivery member system of claim 1, wherein a weight ratio of the functional material to elastomeric matrix is up to 1:1.

6. The delivery member system of claim 1, wherein the functional material is an organic or inorganic compound, a monomer or polymer, or a mixture thereof.

7. The delivery member system of claim 1, wherein the functional material is selected from the group consisting of a lubricant material, a hydrophobic material, an oleophobic material, an amphiphilic material, and mixtures thereof.

8. The delivery member system of claim 1, wherein the functional material is selected from the group consisting of alkanes, fluoroalkanes, alkyl silanes, fluoroalkyl silanes alkoxy-silanes, glycols or polyglycols, mineral oil, synthetic oil, natural oil, and mixtures thereof.

9. The delivery member system of claim 1, wherein the functional material comprises a paraffin oil.

10. The delivery member system of claim 1, wherein the functional material is in the form of liquid, wax, or gel, and mixtures thereof.

11. The delivery member system of claim 1, wherein the delivery member has a surface with a pattern formed thereon.

12. The delivery member system of claim 11, wherein the surface with a pattern formed thereon comprises indentations or protrusions that have a three-dimensional shape selected from the group consisting of spheres, hemispheres, rods, polygons, and mixtures thereof.

13. An image forming apparatus comprising:
a) an imaging member having a charge retentive-surface for developing an electrostatic latent image thereon, wherein the imaging member comprises:
a substrate, and
a photoconductive member disposed on the substrate;
b) a charging unit for applying an electrostatic charge on the imaging member to a predetermined electric potential; and
c) a delivery member disposed in contact with the surface of the imaging member or the surface of the charging unit, wherein the delivery member comprises:
(i) a support member, and
(ii) an elastomeric matrix disposed on the support member, wherein the elastomeric matrix comprises one or more functional materials dispersed within the matrix, the elastomeric matrix delivering one or more functional materials that are transferred to a surface of the charging unit by the delivery member to form an outer layer of the charging unit.

14. The image forming apparatus of claim 13, wherein the imaging member further includes an overcoat layer, wherein the charging unit delivers the one or more functional materials to the imaging member and forms an outer layer which is disposed on the overcoat layer.

15. The image forming system of claim 13, wherein the amount of the functional material delivered onto the surface of the imaging member is controlled by the diffusion rate of the functional material in the elastomeric matrix.

16. A method for making the delivery member for use in an image forming apparatus comprising:
mixing one or more functional materials into a polymer matrix prior to curing the polymer, wherein the functional material is a paraffin oil and mixtures thereof;
depositing the mixture onto a support member to form an elastomeric matrix over the support member; and
curing the elastomeric matrix over the support member to form the delivery member, wherein the functional materials are deliverable from the elastomeric matrix.

17. The method of claim 16, wherein the elastomeric matrix comprises a cross-linked polydimethylsiloxane (PDMS).

18. The method of claim 16, wherein a weight ratio of the functional material to polymer matrix is up to 1:1.

* * * * *